US011758368B2

(12) United States Patent
Krishan

(10) Patent No.: US 11,758,368 B2
(45) Date of Patent: Sep. 12, 2023

(54) METHODS, SYSTEMS, AND COMPUTER READABLE MEDIA FOR SUPPORTING MOBILE ORIGINATED DATA MULTICASTING IN A COMMUNICATIONS NETWORK

(71) Applicant: Oracle International Corporation, Redwood Shores, CA (US)

(72) Inventor: Rajiv Krishan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 182 days.

(21) Appl. No.: 17/489,740

(22) Filed: Sep. 29, 2021

(65) Prior Publication Data

US 2023/0094027 A1 Mar. 30, 2023

(51) Int. Cl.
*H04W 4/06* (2009.01)
*H04W 48/16* (2009.01)
(Continued)

(52) U.S. Cl.
CPC .............. *H04W 4/06* (2013.01); *H04W 4/12* (2013.01); *H04W 8/28* (2013.01); *H04W 48/16* (2013.01);
(Continued)

(58) Field of Classification Search
CPC ........... H04W 4/06; H04W 4/12; H04W 8/28; H04W 48/16; H04W 60/04; H04W 4/70;
(Continued)

(56) References Cited

U.S. PATENT DOCUMENTS

2017/0373961 A1* 12/2017 Dolson .................. H04L 43/12
2019/0116631 A1*  4/2019 Talebi Fard .......... H04W 76/11
(Continued)

FOREIGN PATENT DOCUMENTS

WO    WO-2021064714 A1 *  4/2021 ............. H04L 51/38
WO    WO-2021163260 A1 *  8/2021 ........... H04W 36/023

OTHER PUBLICATIONS

"3rd Generation Partnership Project; Technical Specification Group Core Network and Terminals; Mobility Management Entity (MME) and Serving GPRS Support Node (SGSN) interfaces for interworking with packet data networks and applications (Release 16)," 3GPP TS 29.128, V16.4.0, pp. 1-55 (Sep. 2021).
(Continued)

*Primary Examiner* — Ayaz R Sheikh
*Assistant Examiner* — Louis Samara
(74) *Attorney, Agent, or Firm* — Jenkins, Taylor & Hunt, P.A.

(57) ABSTRACT

Methods, systems, and computer readable media for supporting mobile originated data multicasting in a communications network are disclosed. One method includes receiving, from a consumer network function (NF) in a communications network, a deliver request message containing mobile originated (MO) data corresponding to a protocol data unit (PDU) session, wherein NIDD context information stored at NEF and referred by a context identifier in the deliver request message includes a subscriber identifier and a data network identifier associated with a user device requesting the PDU session and determining that a rule entry belonging to a plurality of rule entries contained in a multicasting ruleset matches at least one of the subscriber identifier and the data network identifier included in the NIDD context information that is stored at the NEF and referred by the context identifier in the deliver request
(Continued)

message. The method further includes accessing a list of NF identity objects in the rule entry in response to determining the rule entry matches at least one of the subscriber identifier and/or the data network identifier and delivering the MO data to each of a plurality of NF endpoints specified in the rule entry in accordance with a routing condition indicated in each of the NF identity objects respectively associated with each of the NF endpoints.

20 Claims, 7 Drawing Sheets

(51) Int. Cl.
*H04W 60/04* (2009.01)
*H04W 8/28* (2009.01)
*H04W 4/12* (2009.01)
*H04L 101/654* (2022.01)

(52) U.S. Cl.
CPC ....... *H04W 60/04* (2013.01); *H04L 2101/654* (2022.05)

(58) Field of Classification Search
CPC ..... H04W 76/10; H04W 76/11; H04W 76/12; H04W 4/60; H04L 2101/654; H04L 43/12
See application file for complete search history.

(56) References Cited

U.S. PATENT DOCUMENTS

| | | | |
|---|---|---|---|
| 2020/0146077 A1* | 5/2020 | Li | H04W 76/10 |
| 2020/0178158 A1* | 6/2020 | Won | H04W 48/18 |
| 2021/0258246 A1* | 8/2021 | Zhang | H04W 4/70 |
| 2021/0274575 A1* | 9/2021 | Talebi Fard | H04W 76/12 |
| 2022/0312163 A1* | 9/2022 | Xu | H04W 4/60 |

OTHER PUBLICATIONS

"3rd Generation Partnership Project; Technical Specification Group Services and System Aspects; Procedures for the 5G System (5GS); Stage 2 (Release 17)," 3GPP TS 23.502, V7.2.1, pp. 1-712 (Sep. 2021).

"3rd Generation Partnership Project; Technical Specification Group Core Network and Terminals; 5G System; Network Exposure (NE) function services for Non-IP Data Delivery (NIDD); Stage 3 (Release 17)," 3GPP 29.541, V7.1.0, pp. 1-40 (Sep. 2021).

"3rd Generation Partnership Project; Technical Specification Group Core Network and Terminals; T8 reference point for Northbound APIs; (Release 17)," 3GPP TS 29.122, V17.3.0, pp. 1-440 (Sep. 2021).

* cited by examiner

Object: AF_Identity

| Fieldname | Value | Description |
|---|---|---|
| Identity | String | Identity for additional AF |
| endpoint | FQDN/IP | FQDN/IP address of additional AF |
| notificationUrl | URL | Notification URL for AF |
| niddRegRequired | [True/False] | Only fork message through AF identity if NIDD configuration is present. |
| sendTrigger | [True/False] | Send NIDD configuration trigger, if NIDD configuration is not present from alternate AF |

FIG. 4

| NIDD Registration Required | Send Trigger | Behavior |
|---|---|---|
| False | - NA - | No NIDD configuration request; Just send MO data to alternate AF endpoint. |
| True | False | Send MO data to alternate AF identity only if NIDD configuration exists. If no configuration from AF exists, do not trigger NIDD configuration. |
| True | True | Send MO data to alternate AF identity only if NIDD configuration exists. If no configuration exists from AF, trigger NIDD configuration towards alternate AF. |

FIG. 5

METHODS, SYSTEMS, AND COMPUTER READABLE MEDIA FOR SUPPORTING MOBILE ORIGINATED DATA MULTICASTING IN A COMMUNICATIONS NETWORK

TECHNICAL FIELD

The subject matter described herein relates to facilitating forking or multicasting of mobile originated (MO) data from Internet of Things (IoT) devices at network exposure functions (NEFs) in fifth generation (5G) communications networks and previous generation communications networks. More particularly, the subject matter described herein relates to methods, systems, and computer readable media for supporting mobile originated data multicasting in a communications network.

BACKGROUND

In telecommunications networks, a service endpoint is an address on a network node that uniquely identifies an entity that provides service to service consumers. The service endpoint can include an Internet protocol (IP) address or a combination of IP address and transport layer port number, which is also referred to as an IP endpoint.

In fifth generation (5G) telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints. Producer NFs register with a network function repository function (NRF). The NRF maintains an NF profile of available NF instances and their supported services. Consumer NFs can subscribe to receive information about producer NF instances that have registered with the NRF. Once registered, NF instances in the 5G network may establish sessions with one or more network exposure functions (NEFs). Notably, the NEF is a Third Generation Partnership Project (3GPP) network function that provides a means to securely expose the services and capabilities provided by producer network functions servicing the network.

At present, the 3GPP specification defines how mobile originated (MO) data is delivered to application functions (AFs) in a 5G system via a network exposure function (NEF). In particular, the NEF is configured to manage protocol data unit (PDU) sessions between user equipment (UE) devices and destination AFs on a one-to-one basis. For example, the NEF is configured to utilize collected context information to map individual non-IP data delivery (NIDD) configurations existing between the NEF and AFs to a respective individual context creation request message sent from a session management functions (SMF) to the NEF. Notably, there is no defined standard that enables multicasting to the AFs, i.e., a "one-to-many" PDU session mapping involving one SMContext create request from an SMF (serving a UE and/or IoT device) to multiple NIDD configurations associated with multiple destination AFs. The inability to fork is problematic considering the increase of IoT devices and/or critical sensors being deployed in the field. Many of these low-power devices are configured to frequently report their operating status via messages flows (e.g., using NB IoT) to several AFs for monitoring or analytic purposes. Consequently, a significant volume of NIDD message traffic flow will be experienced on the one-to-one northbound and southbound interfaces of the NEF due to the UEs and/or IoT devices generating multiple MO messages for delivery to different AF endpoints. Further, not all IoT devices support the capability to maintain multiple PDU sessions (e.g., for reporting to multiple AFs). Alternatively, AF endpoints can be configured to fork the received MO data to another intended destination AF endpoints (e.g., in a chain-like manner) in some situations. However, this mode of operation impractically requires that every AF be individually configured to broadcast to other AF servers associated with unrelated vendor entities. Notably, the described multicasting problem is not limited to 5G systems, but also exists in previous 3GPP defined systems (e.g., 4G systems).

Accordingly, there exists a need for improved methods and systems for supporting mobile originated data multicasting in a communications network.

SUMMARY

Methods, systems, and computer readable media for supporting mobile originated data multicasting in a communications network are disclosed. One method includes receiving, by a network exposure function (NEF) from a consumer network function (NF) in a communications network, a deliver request message containing mobile originated (MO) data corresponding to a protocol data unit (PDU) session, wherein NIDD context information stored at the NEF and referred by a context identifier in the deliver request message includes a subscriber identifier and a data network identifier associated with the user device requesting the PDU session and determining that a rule entry belonging to a plurality of rule entries contained in a multicasting ruleset matches at least one of the subscriber identifier and the data network identifier included in the NIDD context information stored at the NEF and referred by the context identifier in the deliver request message. The method further includes accessing a list of NF identity objects in the rule entry in response to determining the rule entry matches at least one of the subscriber identifier and/or the data network identifier and delivering the MO data to each of a plurality of NF endpoints specified in the rule entry in accordance with a routing condition indicated in each of the producer NF identity objects respectively associated with each of the producer NF endpoints.

According to another aspect of the method described herein, the MO deliver request message received from the consumer NF is a mobile originated data request (ODR) message received from a mobility management entity (MME) in the communications network.

According to another aspect of the method described herein, the MO deliver request message received from the consumer NF is a Nnef_SMContext deliver request message received from a session management function (SMF) in the communications network.

According to another aspect of the method described herein, the subscriber identifier includes an international mobile subscriber identity (IMSI) or a subscription permanent identifier (SUPI) and the data network identifier includes a access point name (APN) or a data network name (DNN).

According to another aspect of the method described herein, the NF endpoints are application function (AF) endpoints or service capability server/application server (SCS/AS) endpoints.

According to another aspect of the method described herein, the routing condition is determined based on a combination of a non-Internet protocol (IP) data delivery (NIDD) registration required parameter value and a sent trigger parameter value.

According to another aspect of the method described herein, each of the plurality of rule entries specifies at least one of a SUPI, an IMSI, a DNN, an APN, a SUPI-DNN pairing, or an IMSI-APN pairing.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 4 depicts an exemplary application function identity object according to an embodiment of the subject matter described herein;

FIG. 5 depicts an exemplary routing behavior table according to an embodiment of the subject matter described herein;

DETAILED DESCRIPTION

The subject matter described herein relates to methods, systems, and computer readable media for supporting mobile originated data multicasting in a communications network. In particular, the disclosed subject matter includes configuring a NEF to be leveraged by different user devices (e.g., UEs, IoT devices, etc.) and application function (AF) servers based on various use-cases. Although the description herein presents a multicasting solution using 5G network elements, system architectures of previous 3GPP defined generations can utilize the described methodology without departing from the scope of the disclosed subject matter. Notably, the multicasting solution can be implemented utilizing 4G elements in a 4G system architecture as detailed below.

As previously indicated, current methods for facilitating the distribution of the NIDD traffic flow from numerous IoT devices and/or critical sensors to various application functions (e.g., for monitoring for analytical purposes) typically require inefficient solutions that involve the generation and transport of a significant amount of mobile originated network traffic messaging that can adversely affect the batteries, central processing units, and memory of the sending IoT devices or critical sensor devices. Likewise, alternative solutions can require each destination application function to be individually and uniquely configured to broadcast the mobile originated data to other unrelated application functions. Rather than attempting to address the problem at the respective origination and destination endpoints, the disclosed subject matter presents a solution at the centrally positioned NEF (or SCEF in 4G systems). Notably, the NEF can be configured to dynamically trigger MO data to additional AF instances in a multicasting or forking manner. In some embodiments, the disclosed subject matter can be further configured to enable the NEF, in response to receiving an MO deliver, to send a NIDD configuration trigger towards additional AF instances that may have not yet conducted a NIDD configuration registration with the NEF.

With the large volume of critical devices and IoT devices that are connected through a 5G network (and/or previous generation networks), the ability to enable the NEF to multicast will assist with attaching the IoT devices and critical sensors to multiple services and/or AF endpoints. Accordingly, this will help serve mission-critical services in an efficient manner. In addition, since the disclosed subject matter is fully backward-compatible and controlled through a network operator configuration, there is no violation of existing 3GPP defined procedures.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
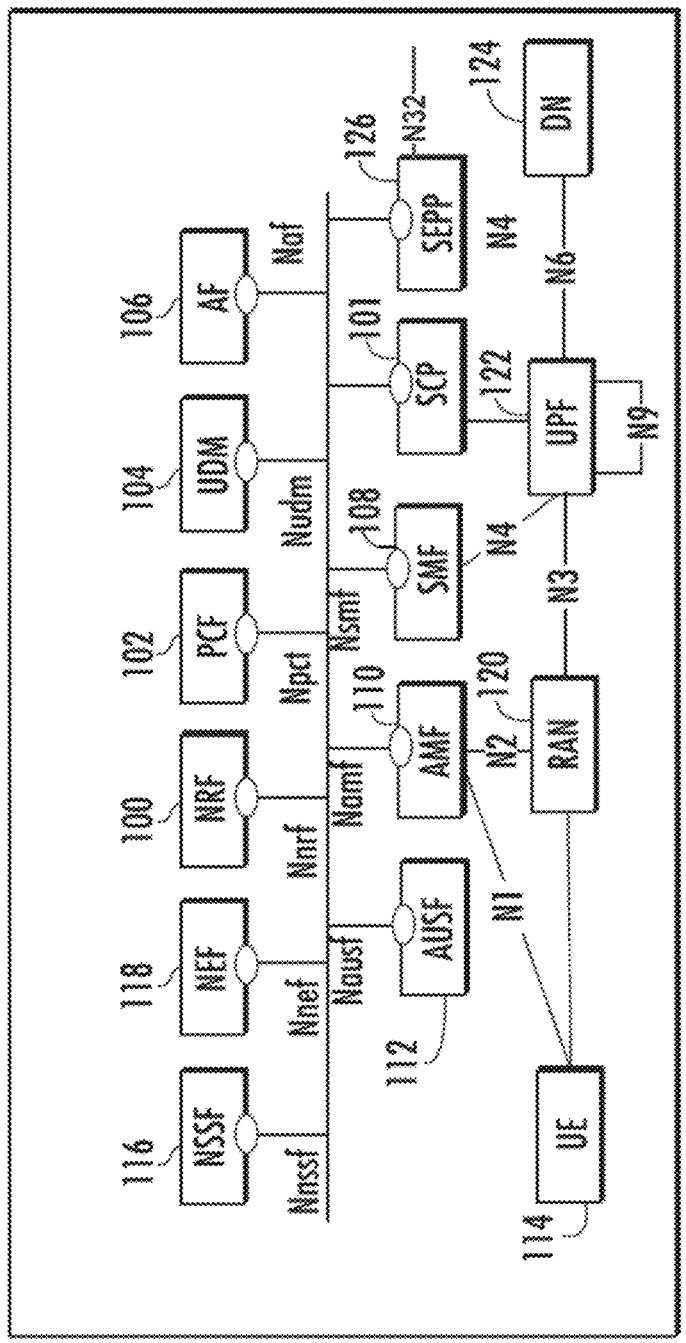
FIG. 1 is a network diagram illustrating an example fifth generation (5G) network architecture.

FIG. 1 is a block diagram illustrating an example 5G system network architecture, e.g., a home 5G core (5GC) network. The architecture in FIG. 1 includes an NRF 100 and an SCP 101, which may be located in the same home public land mobile network (PLMN). As described above, NRF 100 may maintain profiles of available producer NF service instances and their supported services and allow consumer NFs or SCPs to subscribe to and be notified of the registration of new/updated NF service instances. SCP 101 may also support service discovery and selection of NF instances. SCP 101 may perform load balancing of connections between consumer and producer NFs. In addition, using the methodologies described herein, SCP 101 may perform preferred NF location based selection and routing.

NRF 100 is a repository for NF or service profiles of NF instances. In order to communicate with a NF instance, a consumer NF or an SCP must obtain the NF service profile or the NF instance from NRF 100. The NF or service profile is a JavaScript object notation (JSON) data structure defined in 3GPP Technical Specification (TS) 29.510. The NF or service profile definition includes at least one of a fully qualified domain name (FQDN), an Internet protocol (IP) version 4 (IPv4) address, or an IP version 6 (IPv6) address.

In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC requests) between a consumer NF and a producer NF after applying application level security protection.

Figure 2:
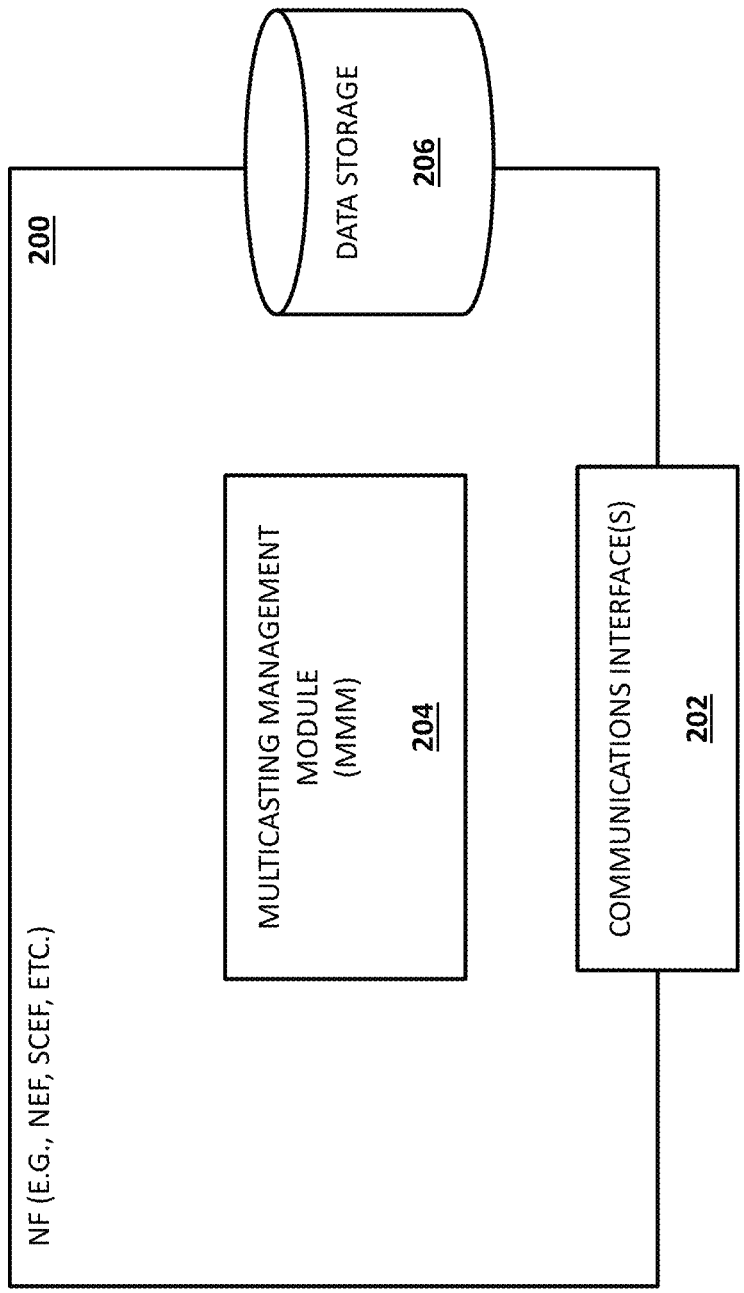
FIG. 2 is a block diagram illustrating an example network function (NF) for supporting the multicasting of mobile originated data according to an embodiment of the subject matter described herein.

FIG. 2 is a diagram illustrating an example NF 200 an example network node for supporting mobile originated data multicasting in a communications network. NF 200 may represent any suitable entity or entities (e.g., one or more node(s), device(s), or computing platform(s)) for performing various aspects associated with facilitating the multicasting or forking of received MO data to a plurality of destination AFs. In some embodiments, NF 200 may represent or include one or more 5GC NFs, such as an NEF. Similarly, NF 200 can represent or include one or more 4GC NFs, such as an SCEF. For example, NF 200 may represent or include an authorization server, a network gateway, a network proxy, an edge security device, an exposure function, or other functionality.

Referring to FIG. 2, NF 200 may include one or more communications interface(s) 202 for communicating messages via a communications environment, e.g., one or more 5G networks (or 4G networks). For example, communications interface(s) 202 may include one or more communication interfaces for communicating with various entities in a home network (e.g., home public land mobile network (H-PLMN)) or a visited network (e.g., a visited public land mobile network (V-PLMN)).

NF 200 may include a mobility management module (MMM) 204. MMM 204 may be any suitable entity (e.g., software stored in memory and executing on at least one processor) for performing one or more aspects associated with multicasting MO data to multiple destination AFs. In some embodiments, MMM 204 may be configured for receiving a MO data deliver request message (e.g., 5G Nnef_SMContext deliver request message or any other {resourceURI}/delivery request message, or a 4G MO data request (ODR) message) associated with a protocol data unit (PDU) session from an SMF or mobility management entity (MME). The NEF and/or MMM subsequently determines if a network operator has configured a custom ruleset containing one or more rules for a particular SUPI, DDN, or SUPI+DNN pairing/combination (or IMSI, APN, or IMSI+APN pairing in 4G systems) corresponding to the originating IoT device or UE. If such a custom ruleset or rules exist, MMM 204 can be configured to distribute the MO data to a plurality of specified application function endpoints with contexts associated with the SUPI and/or DNN (or IMSI and/or APN).

Figure 3:
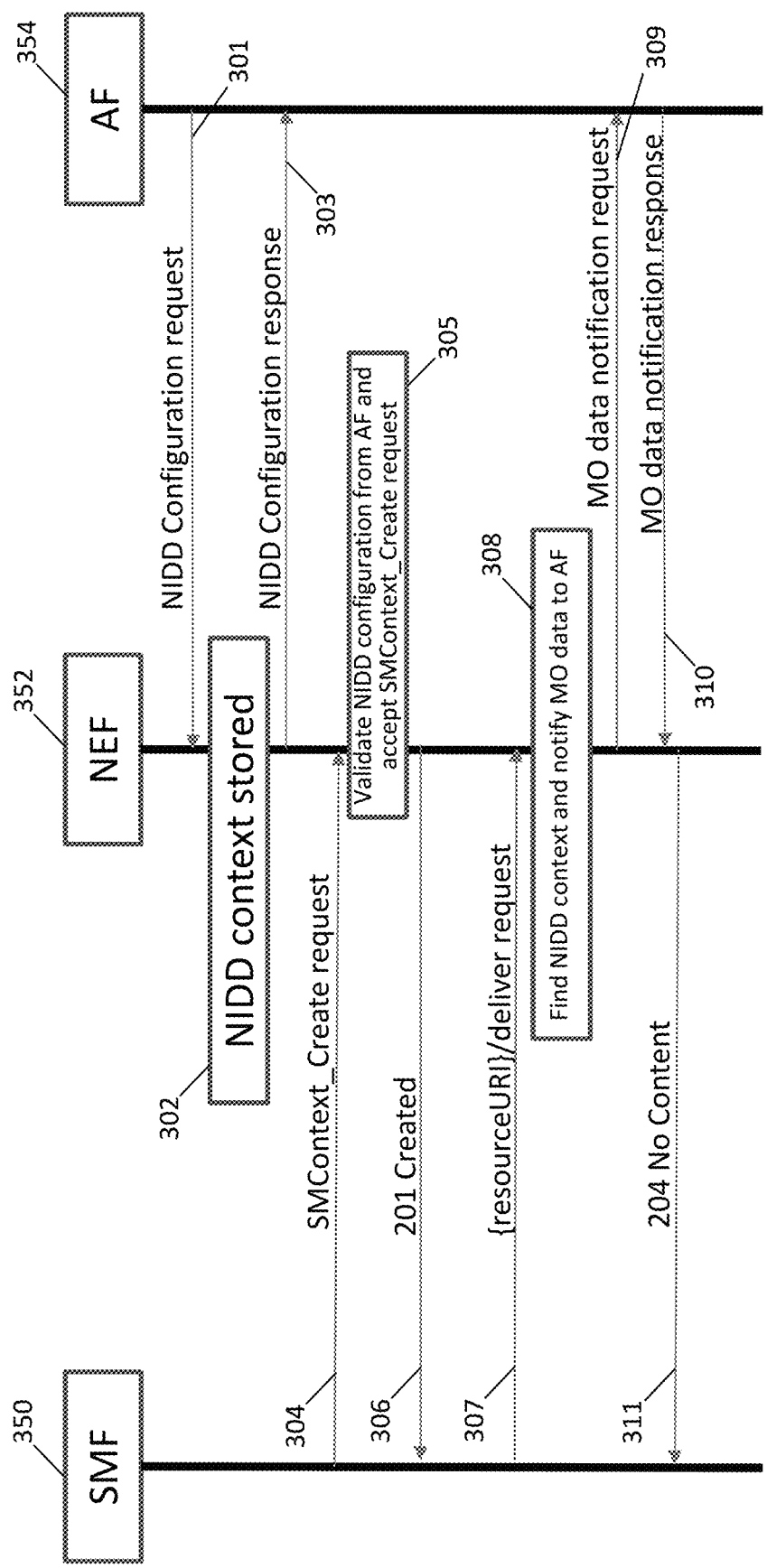
FIG. 3 is a message flow diagram illustrating a network exposure function (NEF) routing non-IP data delivery network traffic under normal conditions.

Prior to describing the disclosed subject matter, a scenario of a common network flow processing by the NEF are presented herein. For example, in FIG. 3, an SMF 350, an NEF 352, and an application function (AF) 354 are depicted as communicating messages pertaining to an existing non-IP data delivery (NIDD) PDU based network traffic flow under normal conditions. In particular, the NIDD flow traverses NEF 352, which attempts to establish a communication PDU session between SMF 350 and application function 354. As shown in FIG. 3, application function 354 is a NF endpoint that sends a NIDD configuration request message 301 to NEF 352. In some embodiments, the configuration request message includes parameters identifying a user equipment that is related to the context configuration being requested (e.g., a monitoring configuration or analytics configuration for the UE or IoT device).

After receiving the configuration request message 301, NEF 352 is configured to store the configuration data in a local database (see block 302). It is understood that the NEF performs other intermediate steps (e.g., obtaining authorization from UDM) that are not necessarily depicted in the FIG. 3, but instead have been omitted for the sake of clarity in the signaling diagram. Notably, the configuration data is stored as NIDD context information. Afterwards, NEF 352 waits for SMF 350 (and/or an associated IoT device or UE) to initiate a PDU session for NIDD. For example, if an IoT device requests a session, SMF 350 subsequently triggers connectivity by sending a SMContext create request message 304 directed to NEF 352. Upon receiving request message 304, NEF 352 is configured to access a context database containing the NIDD context information to locate and validate the NIDD configuration associated with AF 354 (see block 305). After validating the NIDD configuration, AF 354 correlates and/or maps the two contexts. In some examples, the context database contains entries of context data for each AF that includes, but not limited to, a uniform resource identifier (URI), a uniform resource locator (URL), a fully qualified domain name (FQDN), and/or an Internet protocol (IP) network address associated with each AF. Once the configuration is validated, NEF 352 can create a mapping of the two sessions (e.g., NEF's session with SMF 350 and NEF's session with AF 354) and accept request message 304.

Afterwards, NEF 352 is configured to send an acknowledgment message 306 (e.g., a '201 Created' message) to SMF 350. At this stage, when UE sends mobile originated data, SMF 350 triggers deliver request message 307 to NEF 352. In response to receiving the MO data flow and/or deliver request message 307, NEF 352 is configured to find the relevant NIDD context information stored in the local content database (e.g., see block 308). In particular, NEF 352 utilizes the NIDD context data stored in the context database to identify an appropriate serving AF (i.e., AF 354) the mobile originated data should be sent. For example, NEF 352 can send a notification request 309 (e.g., MO data notification request) to application function 354 using the application programming interface (API) provided by the application function during the initial configuration stage. In response, application function 354 returns a notification response message 310 (e.g., MO data notification response) to NEF 152, which in turn sends a '204 no content' message 311. Message 311 serves as an indication to SMF 150 that the MO data notification request 109 was successfully delivered.

Notably, FIG. 3 depicts an NEF that is configured to manage PDU sessions between user equipment devices and destination AFs on a one-to-one basis (e.g., which is defined per 3GPP standards). For example, a single SMContext create request message 304 is mapped by NEF 352 to a single NIDD configuration request message 301. It should be noted that in FIG. 3, there is no UPF involved in the communication of the NIDD flow. In particular, these types of traffic flows are non-IP flows originating from an SMF directed directly toward the application function (i.e., there is no direct data path from the user equipment to the application function since the user equipment does not have an assigned IP address).

In some embodiments, an NEF is modified and/or is provisioned with a multicasting management module (MMM) as described above in the description of FIG. 2. Notably, the MMM can be used by the NEF to maintain multiple AF contexts that can be mapped to a single UE related context (e.g., a single SMContext create request is mapped by the NEF and/or MMM to multiple NIDD configurations associated with a respective multiple AFs). In some embodiments, when an IoT device is deployed, the device may need to provide its status, monitoring, or analytical information (i.e., MO data) to a plurality of AFs. To accommodate this functionality (and avoid repeatedly receiving the same MO data for each of the AFs), the MMM can be configured to maintain a multicasting ruleset (e.g., a multicasting ruleset database) that can be used by the NEF and/or MMM to forward the MO data to a list of AFs and/or trigger a NIDD configuration towards AFs that are not presently registered with the NEF.

In some embodiments, the provisioned multicasting rulesets can be created, configured, and/or modified by a network operator. In general, the rule entries in the ruleset can be based on a group listing (e.g., a set or a range) of mobile subscriber identifiers (e.g., SUPI in 5G or IMSI in 4G) and/or network identifiers (e.g., DNN in 5G or APN in 4G) that is mapped to a list of NF entities (e.g., AFs in 5G or SCS/AS in 4G). For example, a first type of rule set can include a plurality of rule entries that comprises a set and/or range of SUPIs and an associated list of AF identity objects (e.g., <set/range of SUPIs>, <list of AF_Identity>). Notably, this type of rule mandates for any DNN that includes the specified set/range of SUPIs, the NEF and/or MMM will trigger MO data to each of a plurality of alternate AF endpoints that are specified by a list of AF_Identity objects (e.g., software objects)

Likewise, a second type of rule set can include a plurality of rules that comprises a set of DNNs and an associated list of AF identity objects (e.g., <set of DNNs>, <list of AF_Identity>). This type of rule mandates for any MO data for a given DNN session, the NEF and/or MMM triggers MO data to alternate AF endpoints that are specified by the list of AF_Identity objects.

A third type of rule set can include a plurality of rules that comprises a set/range of combined SUPIs and DNNs (e.g., SUPI-DNN pairings) and an associated list of AF identity objects (e.g., <set/range of SUPIs+DNNs>, <list of AF_Identity>). This type of rule mandates for any MO data for a particular SUPI+DNN session, the NEF and/or MMM triggers MO data to alternate AFs that are specified by the list of AF_Identity objects.

In some embodiments, the multicasting ruleset database can be used by a network operator to configure one or more different rule entries by which the NEF is permitted to fork or multicast MO data to a plurality of AF instances. As indicated above, a rule entry can comprise a list of AF identities (or SCS/AS identities) or a collection of AF identity objects. An exemplary AF identity object 400 is shown in FIG. 4. In some embodiments, AF identity object 400 can be a software object that is represented as a table including a 'field name' column 401, a 'value' column 402, and a 'description' column 403. Notably, 'field name' column 401 can contain a number of different parameter fields associated with AF identity object 400. As shown in FIG. 4, column 401 may contain an identity parameter, an endpoint parameter, a notification URL parameter, a NIDDRegRequired parameter, and a sendTrigger parameter. Column 402 in object 400 lists the 'value type' for each of these parameters listed in column 401.

Further, each entry of column 403 contains a description of the corresponding field name parameter listed in column 401. For example, the description for the identity parameter is the identity for an additional destination AF endpoint (or SCS/AS) that can receive the multicast MO data. In some embodiments, the identity can be a unique name, a logical name, or any other identifier that is not necessarily related to routing functionality. In contrast, the 'endpoint' parameter contains actual routing identification information, such as the FQDN or IP address, for the additional AF endpoint. The 'notificationURL' parameter is a notification URL corresponding to the additional AF endpoint. This URL can be used to specify a URL interface that can be utilized by the NEF to notify and/or provide the MO data to the AF endpoint. Notably, the notification URL can be configured along with the identity of the AF and the NEF for additional AF endpoints in the NEF context database.

The 'NIDD registration required' parameter and the 'sendTrigger' parameter can be used in combination as described herein. In particular, the NIDD registration required parameter dictates whether the NIDD configuration must be completed prior to the destination AF endpoint receiving MO data. If this parameter is set to 'false' then the AF endpoint does not need to establish a NIDD configuration or registration to send the MOD data to the AF endpoint. In contrast, if this parameter is set to true, then the AF endpoint requires a NIDD configuration before the AF can receive any MO data from the NEF.

In scenarios where a NIDD configuration is not present in the context database, the NEF will inspect the 'sendTrigger' parameter of the AF Identity object. Namely, if the send trigger parameter is set to 'true', then the NEF can be configured to trigger a notification towards the AF endpoint in order to request the AF endpoint to initiate the NIDD configuration registration procedure. If the 'sendTrigger' parameter is set to false, then the NEF does not send the trigger to the AF endpoint. Instead, the NEF will send the MO data to the destination AF endpoint without requiring a NIDD configuration. This operation is beneficial in scenarios where the AF endpoint is an analytical system or an analytical application server.

In some embodiments, the respective values of the NIDDRegRequired parameter and the sendTrigger parameter can be used to determine the operation behavior of the NEF (and/or its MMM). For example, FIG. 5 illustrates an exemplary behavior table 500 that indicates the multicasting action taken by the NEF (and the MMM) based on the value parameters contained in the associated AF Identity object. Notably, behavior table 500 includes a NIDD registration required column 501 and a send trigger column 502, and a behavior column 503. In particular, the NEF and/or the MMM can compare the values (e.g., 'True' or 'False') in both the NIDDRegRequired and sendTrigger parameter sections of the AF Identity object (e.g., object 400 in FIG. 4) to the parameter value combinations presented in columns 501-502 in behavior table 500. For example, the first entry of table 500 indicates that if the NIDD registration required parameter is set to 'false' (regardless of sendTrigger parameter value) in an AF Identity object, the NEF and/or MMM is configured to send the MO data to the AF endpoint without requiring a NIDD configuration registration. Likewise, the second entry of table 500 indicates that if the NIDD registration required parameter in the AF identity object is set to 'true' and the send trigger parameter is set to 'false', the NEF and/or MMM is configured to send the MO data to the AF endpoint only if the NIDD configuration exists in the context database of the NEF. In addition, if there is no configuration from the AF endpoint stored in the context database, the NEF does not send a NIDD configuration trigger to the AF endpoint in this scenario.

Moreover, the third entry of behavior table 500 indicates that if the NIDD registration required parameter in the AF identity object is set to 'true' and the send trigger parameter is set to 'true, the NEF and/or MMM is configured to send the MO data to the AF endpoint only if the NIDD configuration exists in the context database of the NEF. In addition, if there is no configuration from the AF endpoint stored in the context database, the NEF and/or MMM is configured to send a NIDD configuration trigger to the AF endpoint associated with the AF Identity object to register with the NEF.

Figure 6:
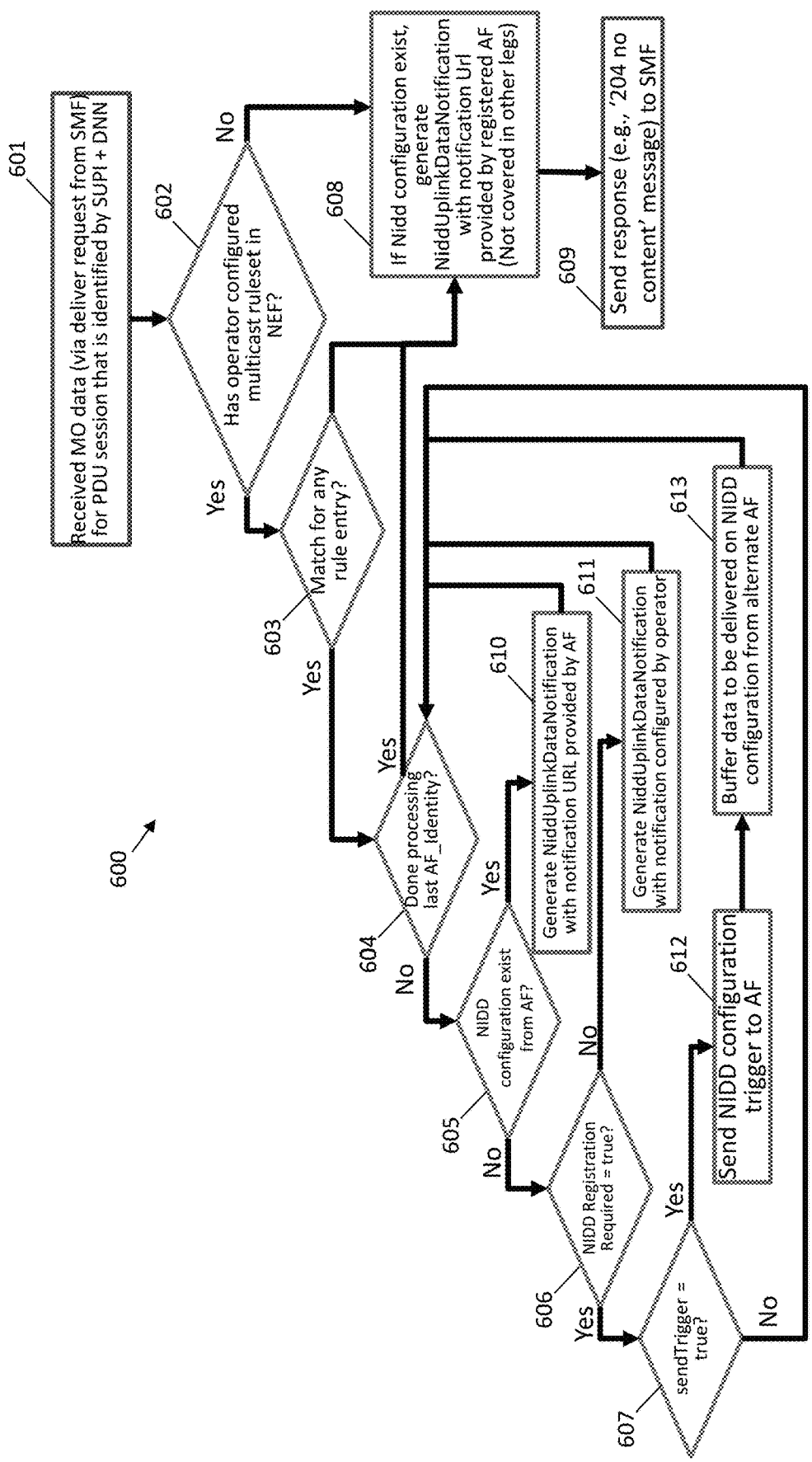
FIG. 6 is a flow chart illustrating the exemplary steps executed by an NEF configured for mobile originated data multicasting support according to an embodiment of the subject matter described herein.

FIG. 6 illustrates an exemplary flow chart of the operation of the MMM and/or its hosting NEF. In some embodiments, block 601 in FIG. 6 shows an NEF receiving a request message containing MO data for a PDU session that is identified by a SUPI and/or DNN identification information (e.g., identifier information contained in the NIDD context information that is stored at NEF and that is referred by a context identifier (e.g., smContextId) in the deliver request message). For example, the request message can be an ODR message from an MME in 4G systems or a deliver request message from an SMF in 5G systems.

In block 602, the NEF and/or MMM makes a determination as to whether the network operator has configured a custom ruleset including at least one of: SUPI, DNN, and/or SUPI+DNN for the NEF (which is included in the NIDD context information that is stored at NEF and referred by either a received ODR message or a received deliver request message). If the NEF is not provisioned with a customized multicast ruleset database, then method 600 continues to block 608. Otherwise, method 600 proceeds to block 603.

In block 608, a NIDDUplinkDataNotification message is generated if the NIDD configuration exists for the destination AF endpoint. More specifically, in response to not locating (or the multicast ruleset not having) a provisioned multicast ruleset database in the NEF, method 600 continues to block 609 where a '204 no content' acknowledgement message is sent to an SMF by the NEF (or an ODA message to an MME or the SCEF in 4G systems).

In block 603, a determination is made as to whether a rule entry in the multicast ruleset database matches the identification information (e.g., SUPI, DNN, or SUPI+DNN) in the request message received by the NEF. More specifically, the NEF can determine whether a rule entry in the ruleset database contains mobile subscriber and network identification information that matches one or more of the SUPI, DNN, and/or SUPI+DNN listings contained in the NIDD context information stored at the NEF and referred by either the received ODR message or deliver request message received in block 601.

If no matching entry exists in the multicast ruleset (i.e., list of rule entries), method 600 continues to block 608. Alternatively, if a matching rule entry does exist, method 600 selects first AF_Identity object from corresponding list of AF_Identity objects (e.g., an "AF_Identity object list") and continues to block 604 where a determination is made as to whether the last AF_Identity in the matching rule entry of the ruleset is processed. Notably, there can be multiple AF Identity objects listed for each rule entry, and for each AF identity object, blocks 605, 606 and 607 are processed. If the AF_Identity is not the last entry in the list, method 600 continues to block 605 where a determination is made as to whether an NIDD configuration exists (in the context database of the NEF) from the AF. If the AF_Identity is the last entry processed in the list (in block 604), method 600 proceeds to block 608.

As indicated above with respect to decision block 605, a determination is made as to whether the NIDD configuration exists in the NEF context database for the destination AF. In some embodiments, the NEF will access its context database to determine whether a NIDD configuration for the AF (or SCS/AS in a 4G system) in question has been previously stored. If the NEF determines that a configuration does exist, the NEF and/or the MMM will generate a data notification message (e.g., a NIDDUplinkDataNotification message) containing a notification URL provided by the application function in block 610. Notably, the NEF and/or MMM will provide the MO data directly to the registered AF endpoint. After the notification message is generated, method 600 loops back to decision block 604 for the next AF Identity object in the list.

If the NEF determines that a NIDD configuration does not exist in the context database (in decision block 605), method 600 proceeds to decision block 606 where the NEF and/or the MMM is configured to determine whether NIDD registration is required for the destination application function. In some embodiments, the NEF and/or the MMM is configured to utilize values included in both the 'NIDD registration request' parameter of the AF Identity object to determine the behavior of the NEF (e.g., see column 503 in table 500). More specifically, the NEF and/or the MMM inspects the NIDDRegRequired parameter in the AF Identity object to determine whether value is 'true' or 'false'. If NIDD registration is required for the AF endpoint (i.e., parameter value=true), then method 600 proceeds to decision block 607. Otherwise, method 600 continues to block 611 where the NEF and/or the MMM will generate a data notification message (e.g., a NIDDUplkinkDataNotification message) containing a notification URL configured by the network operator. After the notification message is generated in block 611, method 600 loops back to decision block 604 for the next AF Identity object in the list.

If the NEF determines that NIDD registration is required in decision block 606, method 600 proceeds to decision block 607 where the NEF and/or the MMM determines whether a sendTrigger option is configured for the destination application function. In some embodiments, the NEF and/or the MMM inspects the 'sendTrigger' parameter in the AF Identity object to determine whether value is 'true' or 'false'. If a sendTrigger is not required for the AF (i.e., value=false), then method 600 loops back to decision block 604. Otherwise, method 600 continues to block 612 where the NEF and/or the MMM will generate and send a NIDD configuration trigger to the AF (or SCS/AS in 4G systems). After the configuration trigger is sent, method 600 continues to block 613 where the MO data to be delivered to the alternate AF is buffered and/or stored by the NEF and/or the MMM. After the NIDD configuration is properly established with the AF endpoint by the NEF and/or the MMM, the previously buffered data can then be delivered to the AF endpoint. Method 600 then proceeds to decision block 604 for the next AF Identity object in the list.

Figure 7:
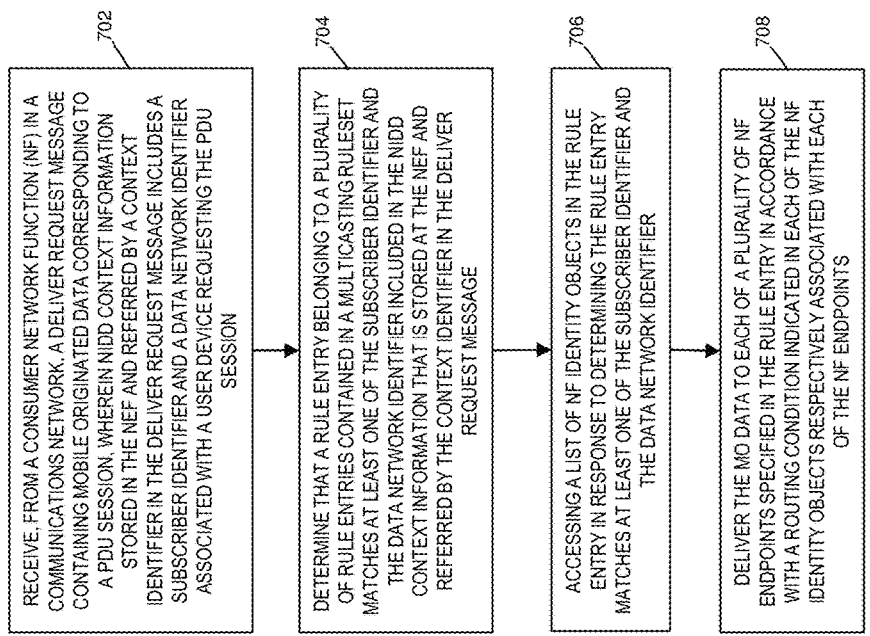
FIG. 7 is a diagram illustrating an example method for supporting mobile originated data multicasting in a communications network according to an embodiment of the subject matter described herein.

FIG. 7 is a flow chart illustrating an example process for supporting mobile originated data multicasting in a communications network according to an embodiment of the subject matter described herein. In some embodiments, method 700 depicted in FIG. 7 is an algorithm, program, or script (e.g., a multicasting management module as shown in FIG. 2) stored in memory that when executed by a processor performs the steps recited in blocks 702-708. In some embodiments, MMM represents a list of steps (or changes in steps) embodied in a state machine (e.g., either via software code programming or via a set of rules) of the NEF.

In block 702, receiving, from a consumer network function (NF) in a communications network, a deliver request message containing mobile originated (MO) data corresponding to a protocol data unit (PDU) session. In some embodiments, the NIDD context information stored at the NEF and that is referred by a context identifier (e.g., smContextId) in the deliver request message includes a subscriber identifier and a data network identifier associated with the user device requesting the PDU session. In some embodiments, an NEF receives a 5G deliver request message from an SMF that refers to the NIDD context stored at the NEF and contains SUPI and DNN identification information (corresponding to a UE/IoT accessing the core network via an access point associated with the DDN). Notably, the SMF is supporting a subscriber UE or IoT device attempting to establish an NIDD session with a plurality of AF services.

In block 704, determining that a rule entry belonging to a plurality of rule entries contained in a multicasting ruleset matches at least one of the subscriber identifier and the data network identifier included in the NIDD context information stored at NEF and that is referred by the context identifier (e.g., smContextId) in the deliver request message. In some embodiments, the NEF and/or MMM accesses rule entries in a customized multicasting ruleset database to locate a listing of SUPIs, DNNs, and/or SUPI-DNN pairings. The NEF and/or the MMM may then attempt to find a match between these identification identifiers in the rule entries with the SUPI and/or the DNN information in the NIDD context information stored at the NEF and that is referred by smContextId in the deliver request message (received in block 702).

In block 706, accessing a list of NF identity objects in the rule entry in response to determining the rule entry matches at least one of the subscriber identifier and the data network identifier. In some embodiments, the NEF and/or the MMM is configured to locate a list of AF Identity objects in the matching rule entry (i.e., the rule entry containing the matching SUPI and/or DNN identification information).

In block 708, delivering the MO data to each of a plurality of NF endpoints specified in the rule entry in accordance with a routing condition indicated in each of the NF identity objects respectively associated with each of the NF endpoints. In some embodiments, the NEF and/or the MMM is configured to inspect the parameter values of each AF identity object in order to determine the routing condition associated with each corresponding destination AF endpoint. In particular, the NEF and/or MMM can access the parameter values indicated in the NIDD registration required parameter field and the send trigger parameter field of the AF identity object to determine the manner in which the MO data is to be delivered to the AF endpoint and/or determine whether an NIDD configuration should be triggered with that AF endpoint (if necessary).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
    receiving, by a network exposure function (NEF) and from a consumer network function (NF) in a communications network, a deliver request message containing mobile originated (MO) data corresponding to a protocol data unit (PDU) session, wherein NIDD context information stored in the NEF and referred by a context identifier in the deliver request message includes a subscriber identifier and a data network identifier associated with a user device requesting the PDU session;
    determining that a rule entry belonging to a plurality of rule entries contained in a multicasting ruleset matches at least one of the subscriber identifier and the data network identifier included in the NIDD context information that is stored at the NEF and referred by the context identifier in the deliver request message;
    accessing a list of NF identity objects in the rule entry in response to determining the rule entry matches at least one of the subscriber identifier and/or the data network identifier; and
    delivering the MO data to each of a plurality of NF endpoints specified in the rule entry in accordance with a routing condition indicated in each of the NF identity objects respectively associated with each of the NF endpoints.

2. The method of claim 1 wherein the deliver request message received from the consumer NF is a mobile originated data request (ODR) message received from a mobility management entity (MME) in the communications network.

3. The method of claim 1 wherein the deliver request message received from the consumer NF is a Nnef_SMContext deliver request message received from a session management function (SMF) in the communications network.

4. The method of claim 1 wherein the subscriber identifier includes an international mobile subscriber identity (IMSI) or a subscription permanent identifier (SUPI) and the data network identifier includes a access point name (APN) or a data network name (DNN).

5. The method of claim 1 wherein the NF endpoints are application function (AF) endpoints or service capability server/application server (SCS/AS) endpoints.

6. The method of claim 1 wherein the routing condition is determined based on a combination of a non-Internet protocol (IP) data delivery (NIDD) registration required parameter value and a sent trigger parameter value.

7. The method of claim 1 wherein each of the plurality of rule entries specifies at least one of a SUPI, an IMSI, a DNN, an APN, a SUPI-DNN pairing, or an IMSI-APN pairing.

8. A system comprising:
at least one processor;
a memory; and
a network exposure function (NEF) in a communications network that is implemented using the at least one processor and the memory, the NEF configured for:
receiving, from a consumer network function (NF) in a communications network, a deliver request message containing mobile originated (MO) data corresponding to a protocol data unit (PDU) session, wherein NIDD context information stored in the NEF and referred by a context identifier in the deliver request message includes a subscriber identifier and a data network identifier associated with a user device requesting the PDU session;
determining that a rule entry belonging to a plurality of rule entries contained in a multicasting ruleset matches at least one of the subscriber identifier and the data network identifier included in the NIDD context information that is stored at the NEF and referred by the context identifier in the deliver request message;
accessing a list of NF identity objects in the rule entry in response to determining the rule entry matches at least one of the subscriber identifier and/or the data network identifier; and
delivering the MO data to each of a plurality of NF endpoints specified in the rule entry in accordance with a routing condition indicated in each of the NF identity objects respectively associated with each of the NF endpoints.

9. The system of claim 8 wherein the deliver request message received from the consumer NF is a mobile originated data request (ODR) message received from a mobility management entity (MME) in the communications network.

10. The system of claim 8 wherein the deliver request message received from the consumer NF is a Nnef_SMContext deliver request message received from a session management function (SMF) in the communications network.

11. The system of claim 8 wherein the subscriber identifier includes an international mobile subscriber identity (IMSI) or a subscription permanent identifier (SUPI) and the data network identifier includes a access point name (APN) or a data network name (DNN).

12. The system of claim 8 wherein the NF endpoints are application function (AF) endpoints or service capability server/application server (SCS/AS) endpoints.

13. The system of claim 8 wherein the routing condition is determined based on a combination of a non-Internet protocol (IP) data delivery (NIDD) registration required parameter value and a sent trigger parameter value.

14. The system of claim 8 wherein each of the plurality of rule entries specifies at least one of a SUPI, an IMSI, a DNN, an APN, a SUPI-DNN pairing, or an IMSI-APN pairing.

15. A non-transitory computer readable medium having stored thereon executable instructions that when executed by at least one processor of a computer cause the computer to perform steps comprising:
receiving, by a network exposure function (NEF) and from a consumer network function (NF) in a communications network, a deliver request message containing mobile originated (MO) data corresponding to a protocol data unit (PDU) session, wherein NIDD context information stored in the NEF and referred by a context identifier in the deliver request message includes a subscriber identifier and a data network identifier associated with a user device requesting the PDU session;
determining that a rule entry belonging to a plurality of rule entries contained in a multicasting ruleset matches at least one of the subscriber identifier and the data network identifier included in the NIDD context information that is stored at the NEF and referred by the context identifier in the deliver request message;
accessing a list of NF identity objects in the rule entry in response to determining the rule entry matches at least one of the subscriber identifier and/or the data network identifier; and
delivering the MO data to each of a plurality of NF endpoints specified in the rule entry in accordance with a routing condition indicated in each of the NF identity objects respectively associated with each of the NF endpoints.

16. The computer readable medium of claim 15 wherein the deliver request message received from the consumer NF is a mobile originated data request (ODR) message received from a mobility management entity (MME) in the communications network.

17. The computer readable medium of claim 15 wherein the deliver request message received from the consumer NF is a Nnef_SMContext deliver request message received from a session management function (SMF) in the communications network.

18. The computer readable medium of claim 15 wherein the subscriber identifier includes an international mobile subscriber identity (IMSI) or a subscription permanent identifier (SUR) and the data network identifier includes a access point name (APN) or a data network name (DNN).

19. The computer readable medium of claim 15 wherein the NF endpoints are application function (AF) endpoints or service capability server/application server (SCS/AS) endpoints.

20. The computer readable medium of claim 15 wherein the routing condition is determined based on a combination of a non-Internet protocol (IP) data delivery (NIDD) registration required parameter value and a sent trigger parameter value.

* * * * *

UNITED STATES PATENT AND TRADEMARK OFFICE
CERTIFICATE OF CORRECTION

| | |
|---|---|
| PATENT NO. | : 11,758,368 B2 |
| APPLICATION NO. | : 17/489740 |
| DATED | : September 12, 2023 |
| INVENTOR(S) | : Krishan |

Page 1 of 1

It is certified that error appears in the above-identified patent and that said Letters Patent is hereby corrected as shown below:

In the Specification

In Column 1, Line 34, delete "network function" and insert -- network --, therefor.

In Column 8, Line 10, delete "objects)" and insert -- objects). --, therefor.

In the Claims

In Column 14, Line 53, in Claim 18, delete "(SUR)" and insert -- (SUPI) --, therefor.

Signed and Sealed this
Second Day of July, 2024

Katherine Kelly Vidal
*Director of the United States Patent and Trademark Office*